Aug. 6, 1935.  W. H. GRIMDITCH  2,010,758
ELECTROLYTIC CONDENSER INSULATION
Filed Sept. 28, 1932

Inventor:
William H. Grimditch
by his Attorneys
Howson & Howson

Patented Aug. 6, 1935

2,010,758

UNITED STATES PATENT OFFICE 2,010,758

ELECTROLYTIC CONDENSER INSULATION

William H. Grimditch, Glenside, Pa., assignor to Philadelphia Storage Battery Company, Philadelphia, Pa., a corporation of Pennsylvania Application September 28, 1932, Serial No. 635,250

1 Claim. (Cl. 175—315)

This invention relates to electrolytic devices and more particularly to electrolytic condensers. Such devices comprise generally a thin metallic container which serves as a cathode or non-rectifying electrode, an electrolyte therein, and an anode or rectifying electrode of film-forming metal immersed in the electrolyte. In such devices, use is made of the film-forming effect exhibited by certain metals such as aluminum, tantalum, etc. The film which forms on these metals during operation of the device has a unidirectional current-conducting characteristic. Such devices are used, for example, in filter circuits to eliminate the alternating current ripples from rectified currents.

In addition to the above elements, there is usually provided an insulating sleeve which conforms generally to the shape of the container and is disposed therein so as to be interposed between the anode and the container to electrically shield these elements one from the other. The insulating sleeve has heretofore been formed of celluloid. It is formed so as to provide spaced projections and apertures, the projections engaging the internal surface of the container to space the sleeve therefrom and apertures allowing the electrolyte to pass therethrough into the space adjacent the container surface.

The object of the present invention is to provide an improved electrolytic condenser which, by virtue of the character of the above-mentioned sleeve, is more efficient and has greater life than other devices of this class. A device embodying the principles of the invention is illustrated on the accompanying drawing in which.

Figure 1:
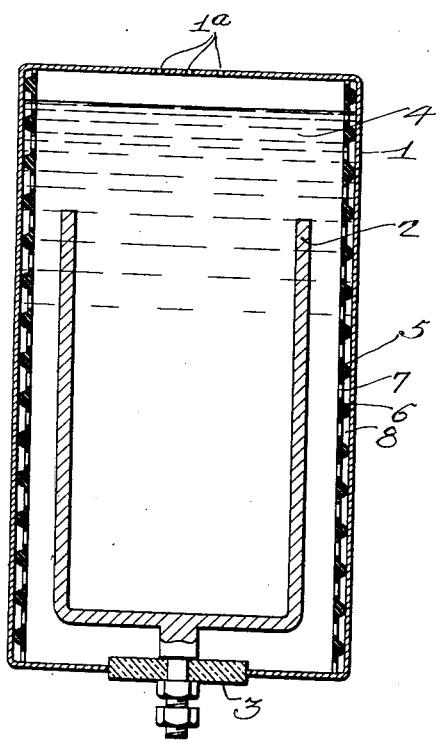
Figure 1 is a sectional view of my improved electrolytic condenser.
Figure 2:
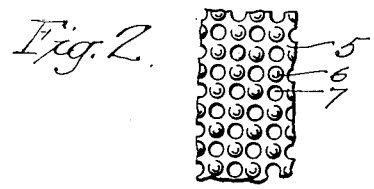
Fig. 2 is a face view of a portion of the surface of insulating sleeve, illustrating more clearly the construction of the sleeve.

Referring to the drawing, the device is formed similarly to known devices of this class, comprising a thin metallic cylindrical container 1 having vent openings 1a therein, which constitutes the cathode, an anode 2 mounted within the container and insulated therefrom by bushing 3, electrolyte 4 within the container, and the insulating sleeve 5, which electrically shields the electrodes from each other. The insulating sleeve is, as above stated, commonly formed so that it fits nicely within the container and has spaced projections 6 and apertures 7, the projections engaging the internal surface of container 1 and spacing the sleeve therefrom so as to provide the space areas 8 immediately adjacent the container surface. The electrolyte flows freely through apertures 7 and contacts the container surface in the spaces 8.

When the insulating sleeve is formed of celluloid, as has been the practice heretofore, it is attacked by the electrolyte and disintegrates more or less rapidly, especially at high temperatures, causing ultimate failure of the device. Moreover the products formed by the chemical action accompanying disintegration of celluloid have a harmful chemical affect on the electrolyte and the electrodes. Devices of this nature are commonly connected in circuits using high voltages and failure of the insulating sleeve is quite serious. The purpose of this sleeve is, of course, to prevent any possibility of contact between the anode and cathode which would result in a short circuit. At the high voltages commonly used, short circuiting of the device will result in injury not only to the device itself but also to the apparatus connected in circuit with it. There is always a possibility that the anode will topple over due to its becoming loose or disintegrating and it would naturally contact the cathodic container were it not for the insulating sleeve. There is also the possibility that the container may become crushed and contact the anode. The construction of this sleeve is, therefore, highly important. The inherent defects of celluloid above mentioned have rendered prior devices objectionable and relatively short lived.

I have found that rubber may be used to great advantage in the construction of the insulating sleeve. When the sleeve is formed of rubber, the objectionable characteristics above mentioned are substantially eliminated. The rubber is not attacked by the electrolyte and will not disintegrate materially. At high temperatures, rubber disintegrates much more slowly than celluloid. Furthermore, the products formed by the chemical action accompanying disintegration of rubber have very little effect on the electrolyte and the electrodes. Rubber maintains its structure at all times, thus effectively maintaining an insulating wall between the electrodes to at all times prevent short circuiting of the device and adding to its life. The sleeve may be formed so as to have the same shape as has been utilized heretofore with the projections and apertures above mentioned. It may be formed from rubber by molding it or in any other suitable manner. Preferably, the rubber should have a substantial degree of rigidity and should, therefore, be relatively hard. It is not strictly essential that the sleeve be formed of pure rubber, but may be formed of a composition whose major constituent is rubber. It must contain no inorganic salts however. It may be washed with warm ammonia to remove dirt from its surface.

It will be understood that the present disclosure is for the purpose of illustration only and that only such limitations as are contained in the appended claim are to be imposed upon the invention.

I claim:

In an electrolytic condenser, a container constituting a cathode, an anode disposed in said container, an electrolyte in said container, and a rubber insulating member interposed between said container and said anode in said electrolyte to electrically shield one from the other, said member conforming in size and shape with said container and having spaced vertical rows of alternate projections and apertures with the projections of one vertical row offset with respect to the projections of the adjacent vertical rows, said projections engaging said container to space said member therefrom, and said apertures permitting the passage of electrolyte therethrough into the space adjacent said container.

WILLIAM H. GRIMDITCH